(12) United States Patent
Haillot

(10) Patent No.: US 9,303,566 B2
(45) Date of Patent: Apr. 5, 2016

(54) METHOD FOR OPTIMIZING THE CONTROL OF A FREE TURBINE POWER PACKAGE FOR AN AIRCRAFT, AND CONTROL FOR IMPLEMENTING SAME

(75) Inventor: Jean-Michel Haillot, Beuste (FR)

(73) Assignee: TURBOMECA, Bordes (FR)

( * ) Notice: Subject to any disclaimer, the term of this patent is extended or adjusted under 35 U.S.C. 154(b) by 376 days.

(21) Appl. No.: 13/817,175

(22) PCT Filed: Aug. 23, 2011

(86) PCT No.: PCT/FR2011/051945
§ 371 (c)(1),
(2), (4) Date: Feb. 15, 2013

(87) PCT Pub. No.: WO2012/025689
PCT Pub. Date: Mar. 1, 2012

(65) Prior Publication Data
US 2013/0151112 A1  Jun. 13, 2013

(30) Foreign Application Priority Data
Aug. 25, 2010 (FR) .................................... 10 56774

(51) Int. Cl.
| | |
|---|---|
| *G06F 19/00* | (2011.01) |
| *G06G 7/70* | (2006.01) |
| *F02C 9/26* | (2006.01) |
| *F02C 7/32* | (2006.01) |
| *F02C 9/28* | (2006.01) |

(52) U.S. Cl.
CPC ... *F02C 9/26* (2013.01); *F02C 7/32* (2013.01); *F02C 9/28* (2013.01); *F05D 2220/329* (2013.01); *F05D 2220/50* (2013.01); *F05D 2270/053* (2013.01); *F05D 2270/06* (2013.01); *F05D 2270/304* (2013.01)

(58) Field of Classification Search
CPC ..................................... F02C 9/26; F02C 9/28
USPC .......................................................... 701/100
See application file for complete search history.

(56) References Cited

U.S. PATENT DOCUMENTS

| | | |
|---|---|---|
| 3,764,814 A | 10/1973 | Griffith |
| 4,185,203 A | 1/1980 | Takeuchi |

(Continued)

FOREIGN PATENT DOCUMENTS

FR  2 178 151  11/1973

OTHER PUBLICATIONS

International Search Report Issued Oct. 18, 2011 in PCT/FR11/51945 Filed Aug. 23, 2011.

*Primary Examiner* — Imran Mustafa
(74) *Attorney, Agent, or Firm* — Oblon, McClelland, Maier & Neustadt, L.L.P.

(57) ABSTRACT

A method optimizing fuel-injection control with driving speeds of apparatuses adjusted by controlling a turbine speed according to power, and optimizing control of a free turbine power package of an aircraft, including a low-pressure body, supplying power to apparatuses and linked to a high-pressure body. The method varies the low-pressure body speed to obtain a minimum speed for the high-pressure body, so power supplied by the apparatuses remains constant. Power supplied by the apparatuses is dependent upon the apparatuses driven speed by the low-pressure body, and a speed set point of the low-pressure body is dependent upon a maximum value of minimum speeds of the apparatuses, enabling required power to be optimized, upon a positive or zero incrementation added to the speed set point of the low-pressure body to minimize speed of the high-pressure body to the apparatuses power supply.

8 Claims, 3 Drawing Sheets

(56) References Cited

U.S. PATENT DOCUMENTS

| | | | |
|---|---|---|---|
| 4,488,236 A | 12/1984 | Morrison et al. | |
| 4,928,482 A * | 5/1990 | Pollak | F02C 9/28 60/39.27 |
| 2003/0126864 A1 * | 7/2003 | Thompson | F02C 9/28 60/788 |
| 2004/0102890 A1 * | 5/2004 | Brunell | 701/100 |
| 2005/0126171 A1 * | 6/2005 | Lasker | 60/645 |

* cited by examiner

METHOD FOR OPTIMIZING THE CONTROL OF A FREE TURBINE POWER PACKAGE FOR AN AIRCRAFT, AND CONTROL FOR IMPLEMENTING SAME

TECHNICAL FIELD

The invention relates to a method for optimizing the regulation of a free-turbine power unit capable of supplying power in an aircraft, as well as a regulation control unit for implementing this method.

The invention relates to free-turbine power units which are fitted in aircrafts, for example airplanes and helicopters, capable of supplying power. Notably, these units can supply power to the equipments (alternators, pumps, superchargers, air conditioning) of the aircraft, directly and/or indirectly via power transfer boxes with multiple-reduction reducers.

These power units include auxiliary power units (in an abbreviated form: APUs) and main power units (in an abbreviated form: MPUs). APUs are used for starting up the main engines of aircrafts and/or for supplying non-propulsive energy (pneumatic, electric and/or hydraulic) on the ground. Certain secured APUs can also intervene in flight in the event of a failure of an engine and try to restart it and/or supply energy to the equipments.

MPUs belong to the engine category because they meet safety standards for main engines, in particular in case of a failure of an engine. Such units are based on an APU which was made more reliable, both in terms of materials and dimensions, in order to obtain the engine-type labelling.

A power unit typically includes an assembly of compressors/chambers of combustion/turbines forming a gas generator. After air/fuel mixture and combustion, hot gases are expanded in the stages of the high-pressure turbine (HP in an abbreviated form) which partially transmits the generated thermal power to the stages of the HP compressor via a high-pressure shaft or HP body. The thermal power of the exhaust gases also drives a free turbine (in an abbreviated form: TL) which, in turn, mechanically transmits power, via a low pressure LP shaft, to the equipments (alternators, pumps, supercharger, etc.) of power generator.

STATE OF THE ART

Typically, a regulation system supplies and measures the quantity of fuel injected into the combustion chamber of the gas generator so as to adjust it to the required level of power. The HP body speed adapts to this injection, after acceleration or deceleration, to reach a constant speed level and supply a thermal power to the LP body. The power transmitted to the LP body supplies then the required power at the constant speed required by the electronic control box (BEC).

In a power unit, the fuel injection regulation comprises, in a known way, the following steps:
  pressurizing the fuel in order to inject it at the appropriate pressure into the combustion chamber,
  measuring out the fuel flow within the predetermined flow rate limits to adjust the level of power supplied by the gas generator to the required level,
  measuring and controlling the rotor speed of the HP body so that said speed remains within the predetermined working limits,
  measuring and controlling the rotor speed of the LP body, and
  determining the set-point value of the HP body speed according to the difference between the set-point value of the LP body speed and its measured speed, as well as the set-point value of the fuel flow to be injected into the combustion chamber according to the difference between the determined set-point value of the HP body speed and its previously measured value.

The rotational speed of each equipment is then imposed by the preliminary choice of its speed close to its permissible maximal speed, where its power supply capacity is maximal. In these conditions, the mass and cost of each equipment are minimized for a permanent functioning at this speed. Furthermore, some equipments like the supercharger must be able to supply a variable adjusted flow, low on the ground and important in flight. The flow rate is expressed in adjusted values in order to make it possible to compare flow rates irrespective of the ambient conditions at air inlet. For a functioning in the whole flight envelope, a variable geometry of the air flow is then provided on the supercharger.

The optimization of such conformations of the fuel injection regulation is achieved by holding the speeds of the driven equipments close to the maximal speeds by the LP body in order to supply the required amounts of power. In particular, no variation in the drive speed of the supercharger is used. And the mere choice of a variable geometry of the air flow imposes then a cumbersome and expensive definition of the supercharger.

The preliminary choice of the speed of the TL turbine is thus guided only by the achieving the maximal-power supply, without any efficiency optimization during the supply of varied levels of power.

In these conditions, during power transients, the regulation system of the power unit reacts only when a LP body underspeed which is lower than the LP body set speed is detected. The speed excursions on the LP body in the power transients are then important because of the high response times of the control loops and the low inertia of the LP shaft with regard to a gas generator with connected power turbine. Considerable speed variations outside the permissible ranges can been seen, in particular excursions beyond the maximal speeds in case of sudden power shed, or below minimal speeds in case of a high need for power.

So, in case of overspeed, the equipments which are driven together are not capable any more of supplying the power required for each of them. In case of overspeed, a monitoring means stops immediately the power unit because of its certification, and thus all the power supplies are not provided any longer.

DISCLOSURE OF THE INVENTION

The invention aims precisely at optimizing the fuel injection regulation in order to avoid the above mentioned problems. To do this, the drive speeds of the equipments are adapted by means of a regulation of the TL turbine speed according to the power.

More precisely, the object of the invention is a method for optimizing the regulation of a free-turbine power unit of the above described type and capable of supplying power to the equipments of an aircraft. In this method, the LP body speed varies in order to obtain a minimal HP body speed so that the power supplied by the equipments remains constant.

According to a preferred embodiment, since the amounts of power supplied by the equipments are dependent upon the speed they are driven by the LP body, the TL turbine LP body speed set-point is dependent upon the maximal value of the equipment minimal speeds enabling the respectively required amounts of power to be obtained in an optimized manner and upon a positive or zero incrementation added to the LP body speed set-point in order to minimize the HP body speed at equal power supplied by the equipments.

According to a particular embodiment, a power measurement supplied continuously by each of the equipments makes it possible to detect a stabilized operation of the requests for power supply and, in that case, to activate the incrementation.

According to advantageous embodiments, the incrementation is determined by calculation from the efficiency curves of the equipments and free turbine or by detecting the variation in the HP body speed, the incrementation being then applied until the HP body speed is minimal.

In particular when an incrementation is determined by calculation, for each equipment, for a level of thermal power of the HP body transmitted to the LP body and for each ambient condition of temperature and pressure at the inlet of the power unit, there is a rotational speed of the LP body which makes it possible to supply a maximal mechanical power to its shaft.

Advantageously, the power supplied to each equipment being maintained within the limits of a range calculated by the manufacturer, the speed at which this equipment is directly or indirectly driven by the LP turbine determines a capacity of supplying power within these limits. The supply of such power according to this capacity makes it thus possible to use only a part power which avoids any wasting and which is defined between the requested need for power and the supplied level of power. For each equipment, the supplied level of power is thus a function of the speed at which it is driven and the supply of a required power is optimized according to the speed at which it is driven.

Besides, the determination of the set-point speed of the LP turbine makes it possible to increase the speed of the equipments to a maximum in order to:
    make the equipments function at full capacity in the whole flight envelope,
    increase the overall efficiency of the LP turbine and equipments, so as to reduce the fuel consumption,
    limit the noise generated by the equipments by varying their speed within the defined ranges, in particular on the ground.

Furthermore, when operating in flight, the supercharger has then an additional degree of freedom through the rotational speed variation. A reduction of its bulk can so be achieved while keeping the same performance.

The in-flight adjusted air flow is sizing for the supercharger. It can take place at maximum speed. Thus, on the ground, since the required adjusted air flow is lower, the drive speed is reduced. Besides, the variation in efficiency of a TL turbine leads to increase its speed in flight with regard to the ground. The combination of these two factors results in a reduction in the fuel consumption.

Besides, an optimal efficiency and sound level can be obtained for each equipment according to the speed at which it is driven speed which deducts from the power supplied to each equipment according to the above method. In particular, the speed decrease reduces the sound level emitted by the supercharger and gas generator, which makes it possible to meet the noise pollution requirements on the ground and on final approach.

According to advantageous embodiments, the LP body rotational speed set-point is regulated firstly and all the time in order to:
    adjust the rotational speed of the LP body to the supply of the power required by each of the equipments;
    adjust the rotational speed of the LP body to the maximal overall efficiency by minimization of the power to be supplied by the HP body according to the required power;
    adjust the rotational speed of the LP body to specific conditions of use, in particular to minimize the sound level.

According to a preferred embodiment, the method provides an additional step of anticipation in which a power unit HP body speed set-point is regulated according to the variation in the required power and/or in the measured power. Advantageously, this "anticipation" function anticipates the normal reaction of a regulation of the engine rate. It makes it possible to anticipate the applied variation in the HP body rotational speed in order to go from a previous request for power associated with the previous HP body speed to a new request for power associated with the HP body speed to be obtained in a steady-state condition. The very soon known data about the required power variation makes it then possible to best anticipate the HP body reaction.

The instantaneous knowledge of the required power, which makes it possible to act immediately on the HP body set-point and thus directly on the HP speed, enables much lower excursions of LP body speeds. These obtained variations thus stay within the limits permitted by the manufacturers of the equipments and the range limits of the TL turbine, the excursions decreasing, for instance, from 30 to 10%. No shedding is necessary and the reliability of the power supply is secured.

The present invention also relates to a regulation control unit capable of implementing the above method. This control combines a LP body speed governor, a HP body speed governor and a fuel-flow regulator. The LP body speed governor includes a comparison tool for elaborating a LP body speed set-point from the measurements transmitted by means for measuring the amounts of power supplied and minimal rotational speeds corresponding to the amounts of power required by each equipment driven by the power unit from power variation data according to the speed for each equipment.

A subtracter measures the difference between the so elaborated set-point and the LP body speed. This difference is transmitted to a first converter which converts it into a HP body speed difference to be transmitted to the HP body speed governor. This HP regulator includes means for elaborating a HP body speed set-point from the first converter. The HP speed set-point goes through a limiting filter which redefines the set-point values within permissible ranges.

The redefined set-point value is then transmitted to the flow regulator in the form of a flow-rate set-point via a second converter. In the flow regulator, the set-point value goes through a limiting filter, which redefines the set-point values within permissible ranges, before being transmitted, in the form of a command, to a fuel-metering valve.

According to particular embodiments:
    a subtracter of HP body speed values at two successive moments supplies correcting increments to the tool for elaborating the LP speed set-point, while taking the constancy of the power measured in a tool for correcting the LP body speed into account;
    a noise limiting filter is also coupled with the LP body speed correcting tool;
    an anticipation comparator is capable of correcting the power unit HP body speed set-point, according to the variation between the supplied power and the measured power, before it is submitted to the speed-limiting filter;
    a means for measuring the power supplied continuously to each equipment, the measurement being direct—in particular a wattmeter or a torquemeter-tachometer assembly—or indirect by calculation from data—in particular using the current-voltage product coming from appropriate instruments;

the variations in the required power are quantified in a digital-processing unit at the input of the HP speed governor from the orders transmitted by the piloting and the control unit of the aircraft flight systems as well as from other already acquired parameters, in particular the ambient conditions of temperature and pressure or the state of the inlets/outlets of the power generator.

BRIEF DESCRIPTION OF THE DRAWINGS

Other aspects, characteristics and advantages of the invention will appear in the following non-restrictive description of particular embodiments, in reference to the accompanying drawings showing respectively.

DETAILED DESCRIPTION OF EMBODIMENTS

Figure 1:
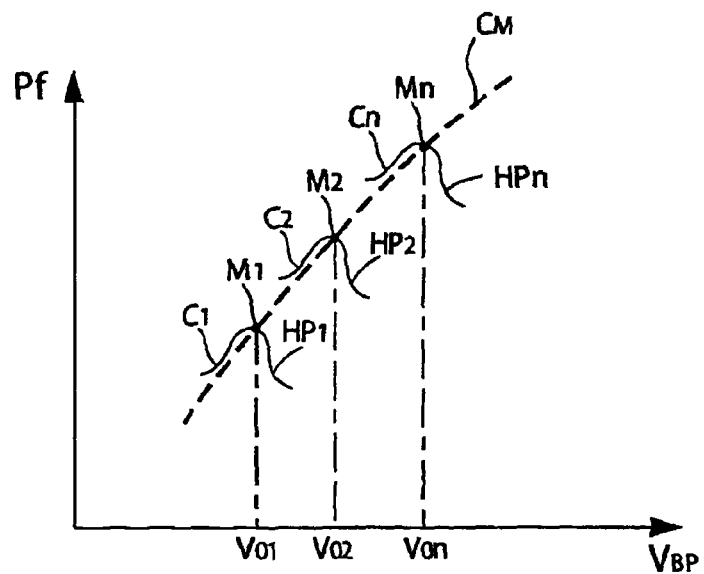
in FIG. 1, a diagram of the curves of variation in the mechanical power supplied by the LP body to its shaft according to its rotational speed in various ambient conditions.

In reference to FIG. 1, curves C1 to Cn of the mechanical power supplied Pf by the LP body of a power unit fitted with a TL turbine are presented. The power Pf is represented according to the rotational speed $V_{BP}$ of the LP body, for a defined ambient condition—of temperature and pressure at the inlet of the LP body and for various levels of thermal power of the HP body, HP1 to HPn. Each curve C1 to Cn has a "two-horned hat" profile. The power maxima, M1 to Mn, correspond then to optimal speeds $V_{O1}, \ldots, V_{on}$ which are situated along an optimal curve $C_M$. This optimal curve $C_M$ is stored so that it can be used in the regulation control unit in order to determine the amplitude of the increment by calculation.

Figure 2:
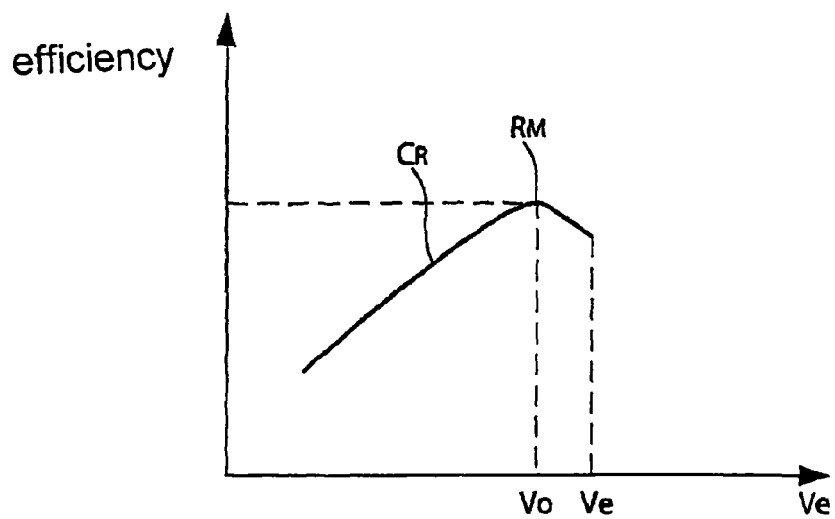
in FIG. 2, a curve of the efficiency of an equipment according to its drive speed in order to define the power required by this equipment.

Besides, FIG. 2 shows the efficiency curve CR for a given level of power supplied to a given equipment, here a supercharger, according to the speed Ve at which this equipment is driven. The maximal efficiency $R_M$ is obtained for an optimal speed $V_O$ close to its permissible maximum speed $V_I$. The speeds $V_O$ for all the equipments are also stored in order to be used in the regulation control unit below.

Figure 3:
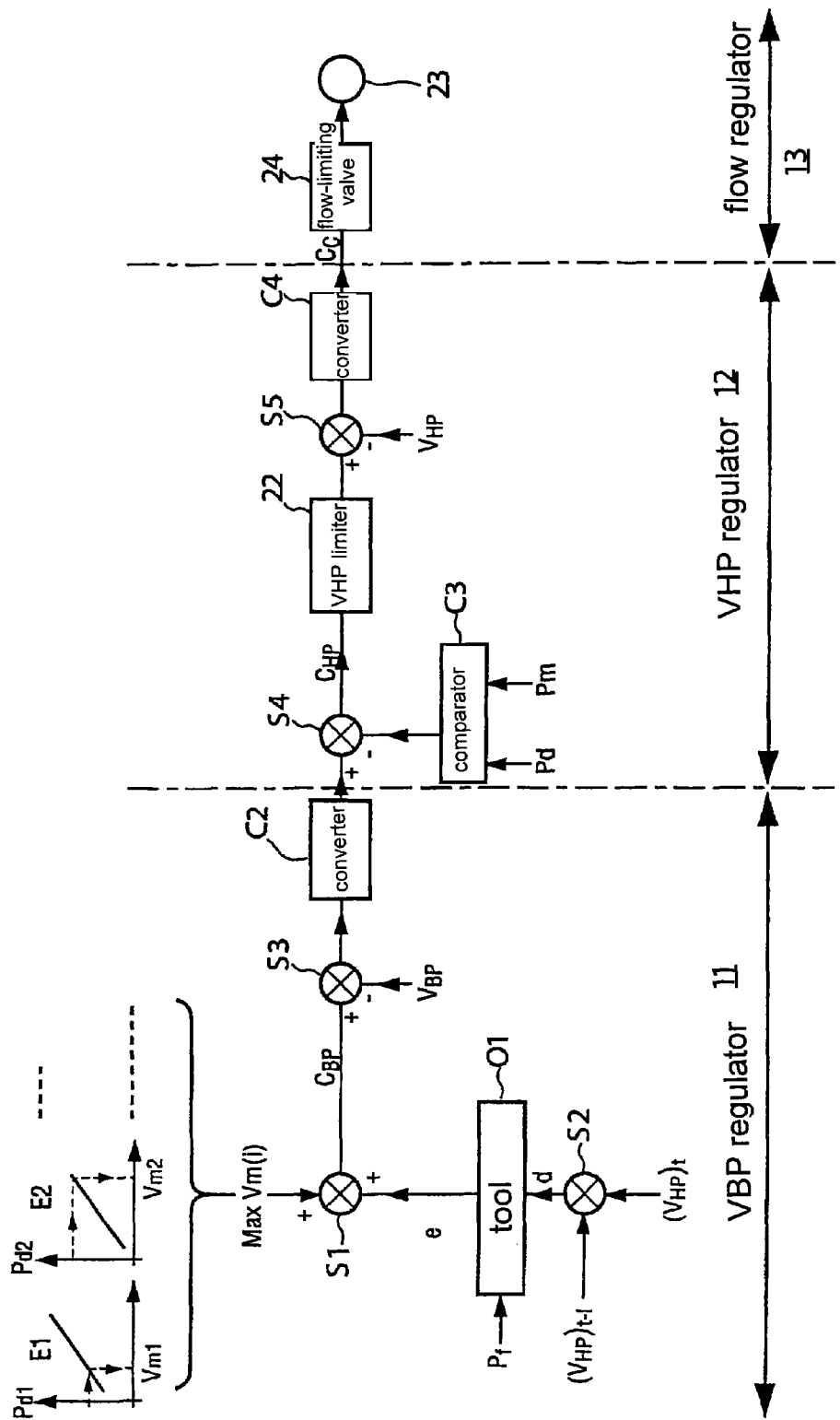
in FIG. 3, a block diagram of an example of regulation control unit according to the invention; and in FIG. 4, a detailed view of a portion of the example of regulation control unit according to the invention.
Figure 4:
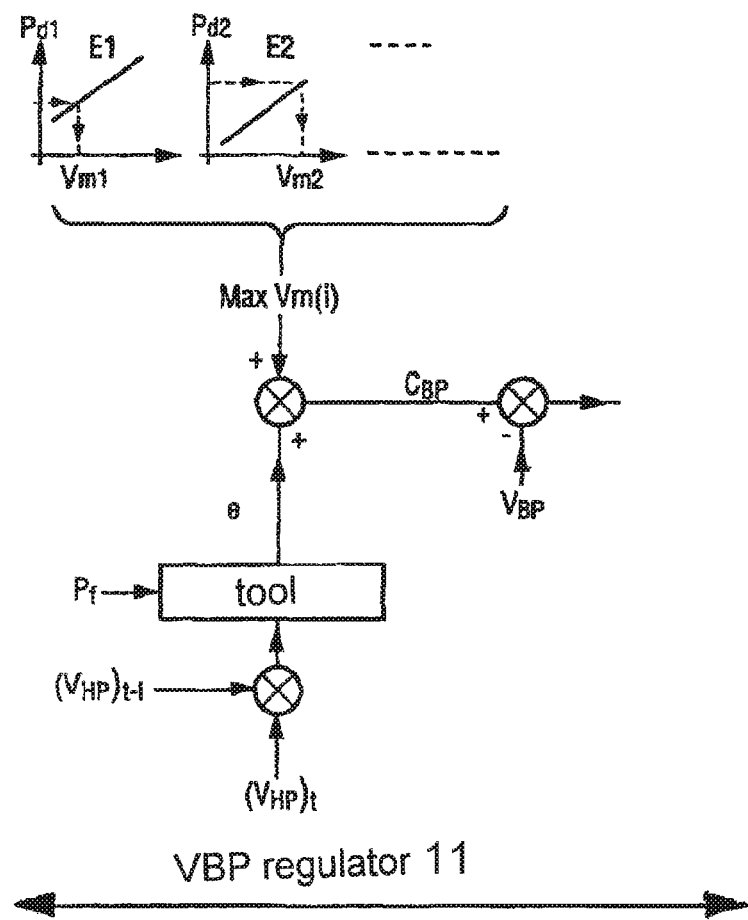

In reference to FIG. 3, an example of regulation control unit 1 includes three regulators 11, 12 and 13. FIG. 4 is a detailed view of the regulator 11. This regulation control unit is provided in a TL free-turbine power unit of an aircraft, in connection with the aircraft piloting system and control unit so as to receive regulation data and instructions. The regulators of the control unit 1 are the following:

a rotational-speed governor 11 for regulating the drive shaft of the LP body of the power unit TL turbine, a speed governor 12 for regulating the HP body of the power unit TL turbine, and a fuel-flow regulator 13 for the power unit.

For each equipment E1, E2, ..., a curve Cm1, Cm2, ..., speeds V1, V2, ..., corresponding to the required amounts of power Pd1, Pd2, ... —for each ambient condition of temperature and pressure at the inlet of the LP body—have been defined by the manufacturer. Each curve Cm1, Cm2, ..., makes it all the time possible to know the minimal speed Vm1, Vm2, ..., from which the equipment is capable of supplying a required part power.

In order to facilitate the data mining, the numerical values of the rotations of the equipments are converted into values of rotation of the LP shaft by taking into account the reduction and/or multiplication factors of the gear trains, which are centralized for example by means of a power transfer box.

For the set Ei of the equipments existing in the example, a maximal value Max(Vmi) of the minimal speeds Vmi is determined in the ambient conditions. This value Max(Vmi) is the maximal permissible speed for each equipment of set Ei. With this value Vmi, all the driven equipments are capable of supplying the power which is required from them. The obtained value Max(Vmi) can be advantageously compared with the permissible limitations, in particular for the range from 50% to 100%.

The so determined value Max(Vmi) is transmitted to a summer S1 of the LP body speed governor 11. At each elaboration of a LP body speed set-point, this summer S1 also integrates a positive LP speed increment "e", here equal to 1%, so as to give a LP body speed set-point value $C_{BP}$ such that:

$$C_{BP} = \text{Max}(\text{Vmi}) + e$$

The LP speed increment "e" is introduced conditionally, until the speed VHP of the HP body is minimized. The variation in the HP body speed is monitored in the subtracter S2 by supplying a difference data "d". If at moment t the value of the measured HP body rotational speed $(V_{HP})$t is lower than that at the previous moment t−1, $(V_{HP})$t−1, then the difference "d" between these values is negative. If, furthermore, the measured power Pf on the LP body has remained constant in this time interval (t-t−1), then a corrective tool O1—to which Pm applies—transmits a value of "e" equal to 1% to the summer S1. Should the opposite occur, the value of the increment is equal to 0. Such a correction makes it possible to free oneself from measurement oscillations and makes it possible to calculate the value of the increment "e".

The incrementation can also be carried out through calculation. At given supplied power for each equipment, various forms can be used: modelling, formation of the equations and search for the minimal point, iteration, etc. The pursued goal is to find the LP body speed which minimizes the HP body speed while the power supplied by each of the equipments remains constant. For example, for an equipment i supplying a power Pmi, to each drive speed $V_{BP}$ corresponds a driving power Pmi of the equipment i. The Pmi sum gives the power to be supplied by the LP body at this speed $V_{BP}$. The curve in the form of a two-horned hat gives the corresponding value of $V_{Hp}$. Calculation determines then the minimal value of $V_{HP}$.

A data relating to noise B1 is advantageously introduced into the corrective tool O1. As long as the noise level in an equipment is higher than a ceiling value, e.g. 100 dB, the noise data also activates an increment "e" and the minimization of the noise at a level lower than this threshold is regulated in a similar way to that of speed $V_{HP}$.

The set-point value $C_{BP}$ for the LP body speed is supplied by the summer S1 and transmitted to a subtracter S3 which compares the measured value $Vm_{BP}$ of the LP body speed with the value $C_{BP}$. A converter C2 converts the LP body speed variation into an equivalent speed variation $V_{HP}$ of the HP body.

This speed variation $V_{HP}$ is transmitted to an anticipation subtracter S4 of the HP body speed regulator 12. The subtracter S4 compares this speed variation $V_{HP}$ with the value coming from a comparator C3 for processing an anticipation "law", so as to obtain the speed set-point value $C_{HP}$ for the HP body.

This anticipation law consists in correcting the speed $V_{HP}$ of the HP body according to the variation in the power Pd required from the equipments and also to the variation in the power measured on the drive shaft Pm.

The anticipation law thus makes it possible, from the variations in the amounts of power to be supplied and measured, to determine the variations in the requirement of power and to determine the variation in speed $V_{HP}$ to be applied to meet a new need for power.

The speed set-point $C_{HP}$ for the HP body is then compared with the limitation values in a limiting filter 22 which redefines the set-point values within permissible ranges.

At the output of the filter 22, the speed set-point $C_{HP}$ is compared with the speed measurement $Vm_{HP}$ in a subtracter S5. The obtained difference is integrated into a converter C4, which converts the speed difference into a fuel-flow difference so as to supply a fuel-flow set-point $C_C$ as an output.

This fuel-flow set-point $C_C$ is transmitted to the flow regulator 13, in the form of a command, to a fuel-metering valve 23 via a flow-limiting valve 24. The variation in the fuel flow injected into the combustion chamber of the power unit modifies then the HP body speed $V_{HP}$, and thus the level of energy supplied. For a constant need for power, this variation the HP body speed $V_{HP}$ modifies the LP body speed $V_{BP}$: a new control loop is born to control the speeds.

The invention claimed is:

1. A method for optimizing regulation of a free-turbine (TL) power unit of an aircraft provided with a low-pressure (LP) body which supplies power to an equipment and which is linked to a high-pressure (HP) body, the method comprising:
    determining a maximal value of minimal speed of the equipment; and
    setting an LP body speed set-point based on a sum of the maximal value of minimal speed and an increment to obtain a minimal HP body speed so that power supplied by the equipment remains constant,
    wherein the increment is introduced conditionally until the minimal HP body speed is obtained, and
    wherein the increment is determined by
    calculating a difference between a measured HP body speed at a time moment and a measured HP body speed at a previous time moment,
    measuring a power on the LP body in a time interval between the time moment and the previous time moment,
    setting the increment to a positive value if the difference of the measured HP body speeds is negative and the measured power on the LP body is constant during the time interval, and
    setting the increment to zero if the measured power on the LP body is not constant during the time interval.

2. An optimization method according to claim 1, wherein the power supplied by the equipment is dependent upon a speed at which the equipment is driven by the LP body, and the LP body speed set-point of the LP body of the TL turbine is dependent upon a maximal value of the equipment minimal speed enabling required amount of power to be obtained in an optimized manner and upon a positive or zero incrementation added to the LP body speed set-point to minimize the HP body speed at equal power supplied by the equipment.

3. An optimization method according to claim 1, wherein a power measurement is supplied continuously by the equipment to detect a stabilized operation of requests for power supply and to activate the incrementation.

4. An optimization method according to claim 1, wherein the increment is determined by calculation from efficiency curves of the equipment and free turbine.

5. An optimization method according to claim 4, wherein, for the equipment, for a level of thermal power of the HP body transmitted to the LP body and for each ambient condition of temperature and pressure at an inlet of the power unit, there is a rotational speed of the LP body for supplying a maximal mechanical power to the shaft of the LP body.

6. An optimization method according to claim 1, wherein a rotational speed set-point of the LP body is regulated at all times to adjust the LP body rotational speed to a supply of the power required by equipment, and/or adjust the LP body rotational speed to the maximal overall efficiency by minimization of the power to be supplied by the LP turbine according to the required power, and/or adjust the LP body rotational speed to specific conditions of use, or to minimize the sound level.

7. An optimization method according to claim 1, further comprising anticipating a regulation of a speed set-point of the HP body of the power unit according to a variation in the power required from the equipment and a variation in the power measured on the drive shaft.

8. An optimization method according to claim 1, wherein the LP body supplies power to a plurality of equipments, and a maximal value of minimal speed of the equipments is determined.

* * * * *